United States Patent
Kang

(10) Patent No.: US 10,847,048 B2
(45) Date of Patent: Nov. 24, 2020

(54) SERVER, METHOD AND WEARABLE DEVICE FOR SUPPORTING MAINTENANCE OF MILITARY APPARATUS BASED ON AUGMENTED REALITY USING CORRELATION RULE MINING

(71) Applicant: FRONTIS CORP., Suwon-si (KR)

(72) Inventor: Jin Suk Kang, Suwon-si (KR)

(73) Assignee: Frontis Corp. (KR)

(*) Notice: Subject to any disclaimer, the term of this patent is extended or adjusted under 35 U.S.C. 154(b) by 88 days.

(21) Appl. No.: 16/212,686

(22) Filed: Dec. 7, 2018

(65) Prior Publication Data
US 2019/0266910 A1    Aug. 29, 2019

Related U.S. Application Data

(63) Continuation of application No. PCT/KR2018/004483, filed on Apr. 18, 2018.

(51) Int. Cl.
*G06K 9/00* (2006.01)
*G09B 9/00* (2006.01)
(Continued)

(52) U.S. Cl.
CPC ............ *G09B 9/003* (2013.01); *G06F 1/163* (2013.01); *G06F 3/04815* (2013.01); *G06T 7/11* (2017.01); *G06T 7/33* (2017.01); *G06T 19/006* (2013.01)

(58) Field of Classification Search
None
See application file for complete search history.

(56) References Cited

U.S. PATENT DOCUMENTS 5,153,722 A * 10/1992 Goedeke .............. G08B 17/125
 169/61
6,529,620 B2 * 3/2003 Thompson .............. G06Q 10/06
 382/141
(Continued)

FOREIGN PATENT DOCUMENTS

CN 202453889 U * 9/2012
FR 2931265 A1 * 11/2009 ............. G08G 5/045
(Continued)

OTHER PUBLICATIONS

A cost-renefits analysis—vehicles, Jeffrey Banks et al., ResearchGate, 2003 pp. 1-11 (Year: 2003).*
(Continued)

*Primary Examiner* — Jayesh A Patel
(74) *Attorney, Agent, or Firm* — LEEPI

(57) ABSTRACT

The present disclosure provides a server, including: a receiving unit that receives an image of a military apparatus from a wearable device worn on the body of a maintenance mechanic; an object recognition unit that recognizes multiple maintenance objects and at least one component object from the image based on a filter that uses an Euclidean distance between pixels in the image; and a maintenance target object extraction unit that predicts a second maintenance target object to be maintained after the maintenance of a first maintenance target object currently being maintained is completed based on predetermined correlation data between the recognized at least one component object and the respective maintenance objects.

16 Claims, 13 Drawing Sheets

(51) Int. Cl.
*G06T 19/00* (2011.01)
*G06T 7/33* (2017.01)
*G06F 3/0481* (2013.01)
*G06F 1/16* (2006.01)
*G06T 7/11* (2017.01)

(56) References Cited

U.S. PATENT DOCUMENTS

| | | | | |
|---|---|---|---|---|
| 6,650,705 | B1* | 11/2003 | Vetro | G06T 9/20 375/240.08 |
| 6,735,015 | B1* | 5/2004 | Blackham | G02B 27/0101 348/121 |
| 7,116,823 | B2* | 10/2006 | Clark | G06K 9/4609 382/199 |
| 7,599,789 | B2* | 10/2009 | Leonard | G01C 21/005 382/103 |
| 8,385,595 | B2* | 2/2013 | Liu | G06T 7/285 382/103 |
| 8,422,777 | B2* | 4/2013 | Aller | G06K 9/62 382/165 |
| 2002/0033946 | A1* | 3/2002 | Thompson | B64F 5/60 356/394 |
| 2002/0110263 | A1* | 8/2002 | Thompson | G07C 9/37 382/115 |
| 2002/0122583 | A1* | 9/2002 | Thompson | G06Q 10/06 382/141 |
| 2003/0215128 | A1* | 11/2003 | Thompson | G06F 16/5866 382/141 |
| 2006/0039587 | A1* | 2/2006 | Yoon | G06K 9/00234 382/115 |
| 2007/0052554 | A1* | 3/2007 | Wallace | G01C 23/00 340/971 |
| 2008/0166014 | A1* | 7/2008 | Marcus | G06T 7/162 382/103 |
| 2009/0309966 | A1* | 12/2009 | Chen | G06T 7/20 348/135 |
| 2009/0322671 | A1* | 12/2009 | Scott | G06F 3/012 345/156 |
| 2011/0081046 | A1* | 4/2011 | van Eekeren | G06T 3/40 382/103 |
| 2011/0141251 | A1* | 6/2011 | Marks | G06T 7/11 348/61 |
| 2011/0200193 | A1* | 8/2011 | Blitz | H04W 12/1206 380/277 |
| 2012/0269446 | A1* | 10/2012 | Nakajima | G06T 7/73 382/201 |
| 2012/0293548 | A1* | 11/2012 | Perez | G06F 3/012 345/633 |
| 2013/0127980 | A1* | 5/2013 | Haddick | G02B 27/0093 348/14.08 |
| 2014/0022074 | A1* | 1/2014 | Balinski | G16H 40/20 340/539.13 |
| 2014/0337319 | A1* | 11/2014 | Chen | G06Q 10/10 707/722 |
| 2015/0030312 | A1* | 1/2015 | Chen | G06T 11/001 386/278 |
| 2015/0220613 | A1* | 8/2015 | Tsubouchi | G06Q 10/10 707/746 |
| 2016/0034778 | A1* | 2/2016 | Wang | G08G 1/0175 382/105 |
| 2018/0204057 | A1* | 7/2018 | Yu | G06T 7/174 |
| 2019/0266403 | A1* | 8/2019 | Kang | G06F 3/013 |

FOREIGN PATENT DOCUMENTS

| | | |
|---|---|---|
| KR | 10-2009-0105485 A | 10/2009 |
| KR | 10-0972849 B1 | 7/2010 |
| KR | 10-2014-0031466 A | 3/2014 |
| KR | 10-1384627 B1 | 4/2014 |
| KR | 10-2015-0074429 A | 7/2015 |
| KR | 10-2017-0126843 A | 11/2017 |
| KR | 101906560 B1 * | 10/2018 |

OTHER PUBLICATIONS

The bebefits of using head mounted displays—enviornment, Robert Thompson etal.,2010, IEEE, p. 1 (Year: 2010).*
International Search Report of PCT/KR2018/004483 dated Nov. 20, 2018.

* cited by examiner

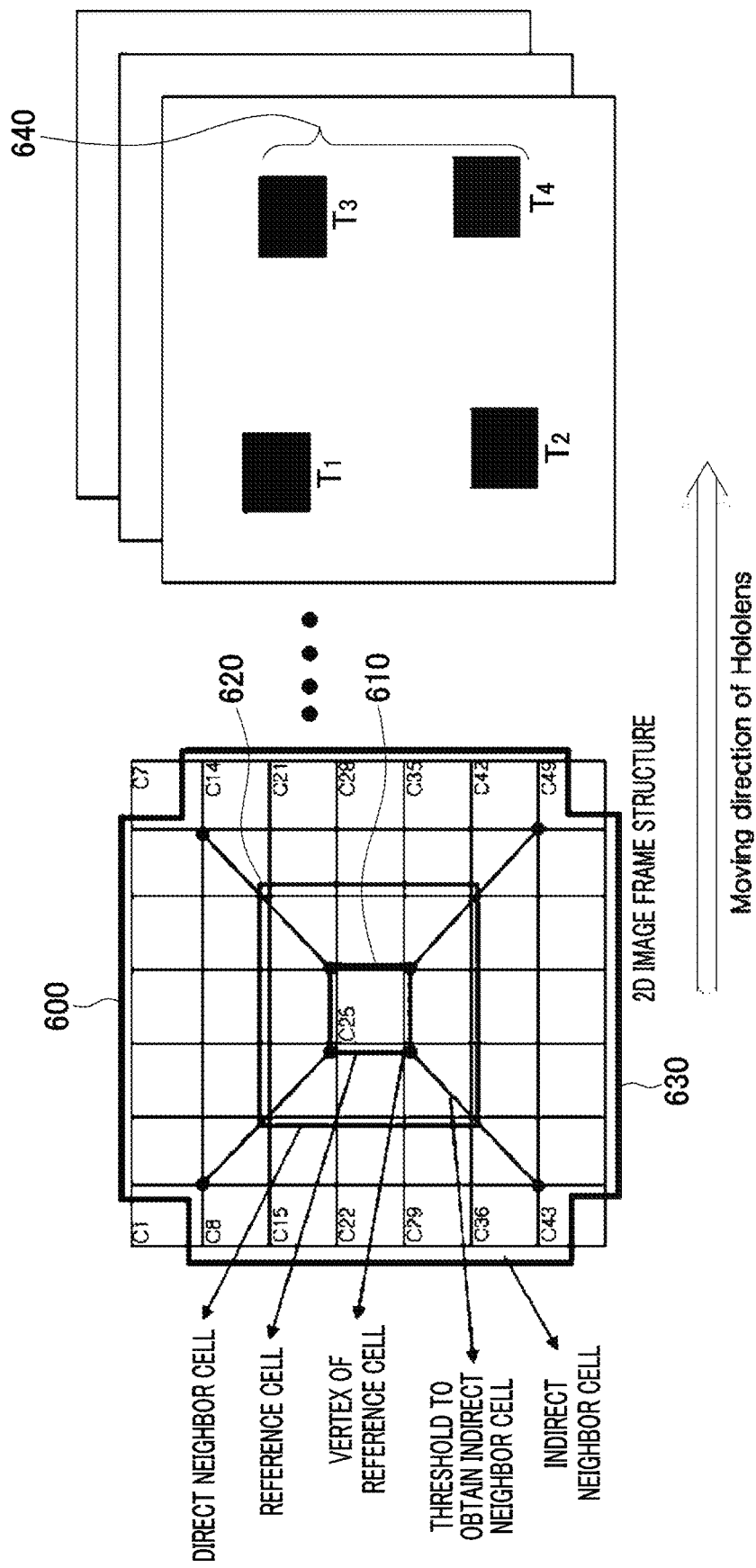

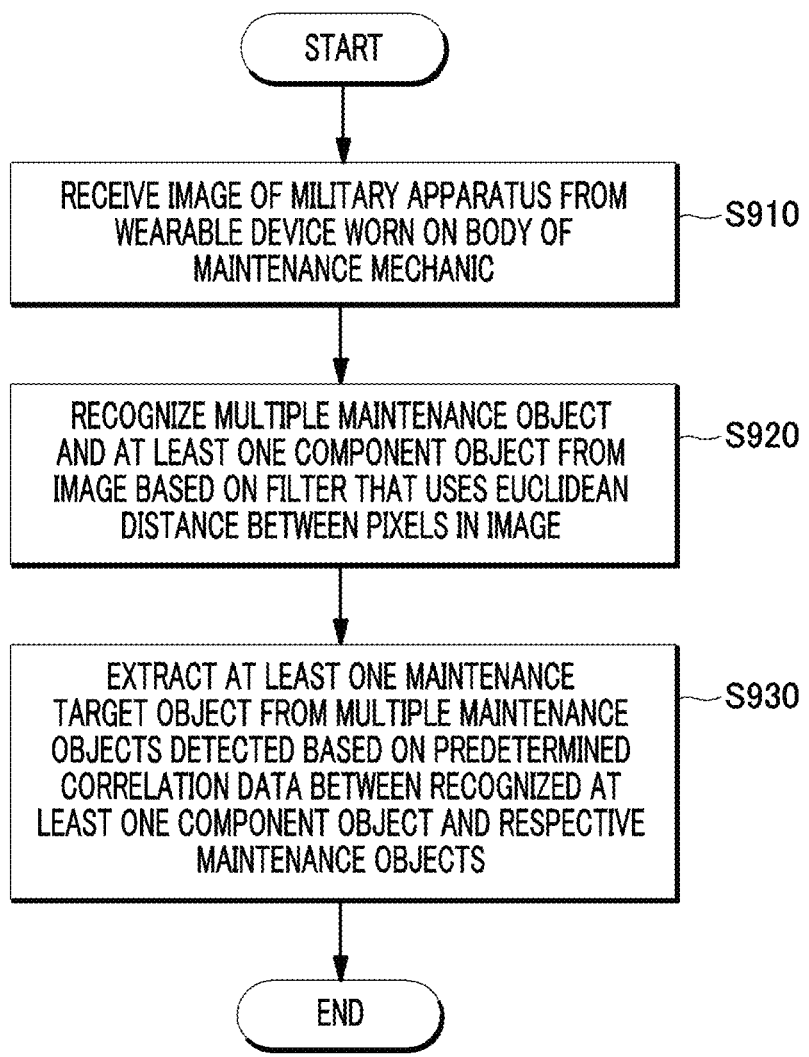

SERVER, METHOD AND WEARABLE DEVICE FOR SUPPORTING MAINTENANCE OF MILITARY APPARATUS BASED ON AUGMENTED REALITY USING CORRELATION RULE MINING

TECHNICAL FIELD

The present disclosure relates to a server, a method and a wearable device for supporting the maintenance of a military apparatus based on correlation data between objects in augmented reality.

BACKGROUND

An interactive electronic technical manual (IETM) has been used to maintain a military apparatus and a weapon system in support of the maintenance of a military apparatus and the extents of component information data have become varied. Thus, various methodologies have been proposed to analyze an immense amount of data. The general object recognition technology has been used to find useful correlation of image (2D), video (3D) and virtual/augmented/mixed reality-based unstructured data from conventional text type data, extract future actionable information, and use the information in decision making. The general object recognition technology refers to a technology of recognizing the category of an object from an image by using various features of the object. Conventional object recognition technologies have typically estimated an object by using a color, a feature point, a pattern, etc. of the object.

However, as for military apparatuses, the same color and the same pattern are used on the outsides of the military apparatuses. Therefore, it has been difficult to apply the conventional object recognition technologies to the military apparatuses.

Meanwhile, a head-mounted display (HMD) is a display device worn on the head and refers to a next-generation display device that enables a user who wears the HMD on the head to directly watch images before his/her eyes. The HMD usually displays a virtual image or virtual UI overlaid on the real world.

As one of the prior arts relevant to the HMD, Korean Patent Laid-open Publication No. 2009-0105485 discloses a multi-media offering system using a HMD and an offering method thereof.

In recent years, a service for supporting the maintenance of a military apparatus by using a HMD has been provided. However, the maintenance of a military apparatus by using a HMD requires a lot of time to recognize a maintenance object due to a distance between the HMD and the maintenance object of the military apparatus.

SUMMARY

In view of the foregoing, the present disclosure provides a server, a method and a wearable device for supporting the maintenance of a military apparatus that can minimize time required to recognize a maintenance object and a component object when performing the maintenance of a military apparatus using a wearable device.

The present disclosure provides a server, a method and a wearable device for supporting the maintenance of a military apparatus that can analyze correlation rules for the maintenance support for a military apparatus by using a data mining technique and support maintenance based on the analysis result.

The present disclosure provides a server, a method and a wearable device for supporting the maintenance of a military apparatus that provide a maintenance progress notification through a screen of a wearable device to provide a maintenance mechanic with convenience in performing the maintenance of the military apparatus.

The present disclosure provides an augmented reality (AR)-based server, method and wearable device for supporting the maintenance of a military apparatus that facilitate the support of maintenance in a virtual environment and the management of a maintenance education system by recognizing a component object for the maintenance of the military apparatus and extracting a maintenance target object.

It has been difficult to efficiently manage and classify data based on texture form or document with the existing interactive electronic technical manual (IETM). Therefore, the present disclosure provides a server, a method and a wearable device for supporting the maintenance of a military apparatus that enable effective management of this by using multimedia data such as virtual reality (VR), augmented reality (AR), mixed reality (MR), etc.

The present disclosure provides a server, a method and a wearable device for supporting the maintenance of a military apparatus that can build up an infrastructure for generally managing the maintenance support and the maintenance education for the military apparatus by applying MR technology through interworking of sensor data about maintenance details of the military apparatus and component information with location-based technology.

However, problems to be solved by the present disclosure are not limited to the above-described problems. There may be other problems to be solved by the present disclosure.

According to an aspect of the present disclosure, a server includes: a receiving unit that receives an image of a military apparatus from a wearable device worn on the body of a maintenance mechanic; an object recognition unit that recognizes multiple maintenance objects and at least one component object from the image based on a filter that uses an Euclidean distance between pixels in the image; and a maintenance target object extraction unit that predicts a second maintenance target object to be maintained after the maintenance of a first maintenance target object currently being maintained is completed based on predetermined correlation data between the recognized at least one component object and the respective maintenance objects.

According to another aspect of the present disclosure, a method for supporting maintenance includes: receiving an image of a military apparatus from a wearable device worn on the body of a maintenance mechanic; recognizing multiple maintenance objects and at least one component object from the image based on a filter that uses an Euclidean distance between pixels in the image; and predicting a second maintenance target object to be maintained after the maintenance of a first maintenance target object currently being maintained is completed based on predetermined correlation data between the recognized at least one component object and the respective maintenance objects.

According to yet another aspect of the present disclosure, a wearable device includes: a photographing unit that photographs a military apparatus with a camera provided in the wearable device; a transmission unit that transmits a photographed image of the military apparatus to a maintenance supporting server; a receiving unit that receives a maintenance progress notification about a maintenance target object of the military apparatus from the maintenance supporting server; and a display unit that displays the received maintenance progress notification about the maintenance target object on a display. Herein, as for the maintenance target object, a second maintenance target object to be maintained after the maintenance of a first maintenance target object currently being maintained is completed is predicted based on predetermined correlation data between at least one component object and respective maintenance objects recognized by the maintenance supporting server, and the at least one component object and the respective maintenance objects are recognized by the maintenance supporting server based on a filter that uses an Euclidean distance between pixels.

The above-described aspects are provided by way of illustration only and should not be construed as liming the present disclosure. Besides the above-described embodiments, there may be additional embodiments described in the accompanying drawings and the detailed description.

According to the present disclosure, it is possible to provide a server, a method and a wearable device for supporting the maintenance of a military apparatus that can minimize time required to recognize a maintenance object and a component object when performing the maintenance of a military apparatus using a wearable device.

Further, according to the present disclosure, it is possible to provide a server, a method and a wearable device for supporting the maintenance of a military apparatus that can analyze correlation rules for the maintenance support for a military apparatus by using a data mining technique and support maintenance based on the analysis result.

Furthermore, according to the present disclosure, it is possible to provide a server, a method and a wearable device for supporting the maintenance of a military apparatus that provide a maintenance progress notification through a screen of a wearable device to provide a maintenance mechanic with convenience in performing the maintenance of the military apparatus.

Moreover, according to the present disclosure, it is possible to provide an augmented reality (AR)-based server, method and wearable device for supporting the maintenance of a military apparatus that facilitate the support of maintenance in a virtual environment and the management of a maintenance education system by recognizing a component object for the maintenance of the military apparatus and extracting a maintenance target object.

It has been difficult to efficiently manage and classify data based on texture form or document with the existing interactive electronic technical manual (IETM). Therefore, according to the present disclosure, it is possible to provide a server, a method and a wearable device for supporting the maintenance of a military apparatus that enable effective management of this by using multimedia data such as virtual reality (VR), augmented reality (AR), mixed reality (MR), etc.

Further, according to the present disclosure, it is possible to provide a server, a method and a wearable device for supporting the maintenance of a military apparatus that can build up an infrastructure for generally managing the maintenance support and the maintenance education for the military apparatus by applying MR technology through interworking of sensor data about maintenance details of the military apparatus and component information with location-based technology.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6A and FIG. 6B are example diagrams provided to explain a process of recognizing a component object of a military apparatus and extracting pixels of the component object in accordance with various embodiments described herein.

FIG. 9 is a flowchart showing a method for supporting the maintenance of a military apparatus by a server in accordance with various embodiments described herein.

DETAILED DESCRIPTION

Figure 1:
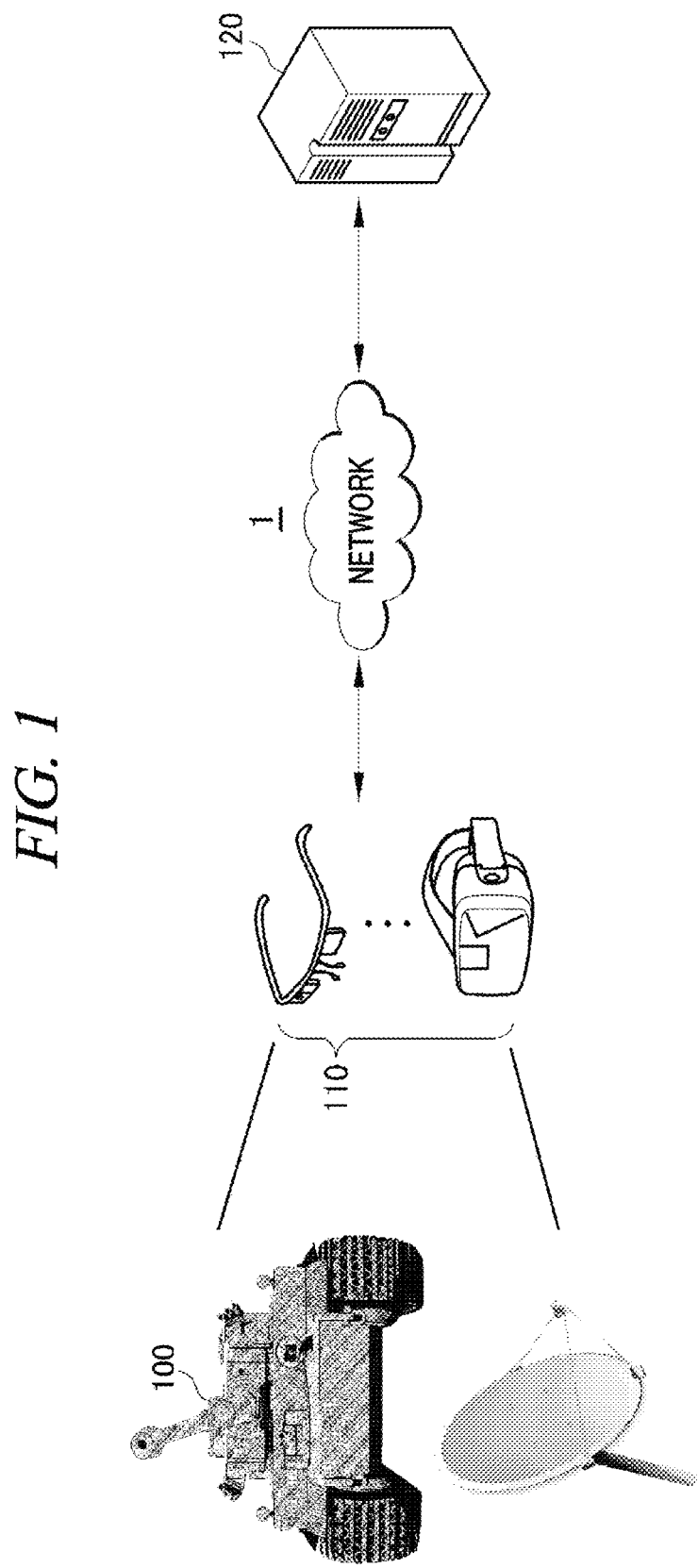
FIG. 1 is an example diagram illustrating a system for supporting the maintenance of a military apparatus in accordance with various embodiments described herein.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a device or apparatus may be carried out by a server connected to the device or apparatus. Likewise, a part of an operation or function described as being carried out by a server may be carried out by a device or apparatus connected to the server.

Hereinafter, embodiments of the present disclosure will be described in detail with reference to the accompanying drawings.

FIG. 1 is an example diagram illustrating a system for supporting the maintenance of a military apparatus in accordance with various embodiments described herein. Referring to FIG. 1, a system 1 for supporting the maintenance of a military apparatus may include a wearable device 110 and a maintenance supporting server 120. The wearable device 110 and the maintenance supporting server 120 are illustrated as examples of the components which can be controlled by the system 1 for supporting the maintenance of a military apparatus.

The components of the system 1 for supporting the maintenance of a military apparatus illustrated in FIG. 1 are typically connected to each other via a network. For example, as illustrated in FIG. 1, the wearable device 110 may be connected to the maintenance supporting server 120 simultaneously or sequentially.

The term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The wearable device 110 may photograph a military apparatus 100 with a camera provided in the wearable device 110.

The wearable device 110 may transmit a photographed image of the military apparatus 100 to the maintenance supporting server 120.

The wearable device 110 may receive a maintenance progress notification about a maintenance target object of the military apparatus 100 from the maintenance supporting server 120 and display the received maintenance progress notification about the maintenance target object on a display. For example, the wearable device 110 may display the maintenance progress notification in the form of augmented reality (AR), virtual reality (VR), or mixed reality (MR) on the display. The maintenance progress notification may include, for example, a notification about a maintenance target object to be currently maintained and a notification about a maintenance target object to be subsequently maintained.

The wearable device 110 may receive maintenance information of the maintenance target object of the military apparatus 100 from the maintenance supporting server 120 and display the received maintenance information of the maintenance target object on the display. For example, the wearable device 110 may receive the maintenance information in the form of AR, VR, or MR from the maintenance supporting server 120. The maintenance information may include, for example, maintenance details of the maintenance target object and maintenance guide information for the maintenance target object.

Examples of the wearable device 110 may include a HoloLens, a smart glass, a head-mounted display (HMD), or a head-up display (HUD) which can be worn on the body of a maintenance mechanic.

The maintenance supporting server 120 may receive the image of the military apparatus 100 from the wearable device 110 worn on the body of the maintenance mechanic.

The maintenance supporting server 120 may recognize multiple maintenance objects and at least one component object from the image based on a filter that uses an Euclidean distance between pixels in the image. To this end, the maintenance supporting server 120 may segment a frame of the image into multiple cells and extract an edge of at least one component object by applying a location of the extracted at least one component object to a cell of the frame of the image.

For example, the maintenance supporting server 120 may extract particle areas corresponding to the respective maintenance objects by applying a color- and texture-based particle filter to the image. Herein, the filter that uses an Euclidean distance between pixels is an adaptive Kalman filter and the maintenance supporting server 120 may track at least one component object being moved by a maintenance mechanic from the image by applying the adaptive Kalman filter to the particle areas. The adaptive Kalman filter will be described later.

The maintenance supporting server 120 may extract pixels from the recognized at least one component object. In this case, the maintenance supporting server 120 may cluster the extracted at least one pixel into similar pixel groups. For example, the maintenance supporting server 120 may extract the clustered similar pixel groups as multiple candidate maintenance areas and extract a maintenance area including a first maintenance target object from among the extracted multiple candidate maintenance areas by using distances between at least one component object and respective maintenance target objects.

The maintenance supporting server 120 may extract the first maintenance target object from among the multiple maintenance objects based on the distances between the recognized at least one component object and the respective maintenance objects. The maintenance supporting server 120 may determine, from the image, an approach state of at least one component object being moved by the maintenance mechanic to each maintenance object. For example, the maintenance supporting server 120 may extract a maintenance object which the at least one component object is approaching as the first maintenance target object, recognize at least one component object included in the first maintenance target object, and extract a location of the recognized component object.

The maintenance supporting server 120 may further receive at least one of gaze information of the maintenance mechanic and head motion information of the maintenance mechanic from the wearable device 110.

The maintenance supporting server 120 may correct the focus of the maintenance mechanic's gaze based on the gaze information of the maintenance mechanic and the head motion information of the maintenance mechanic.

The maintenance supporting server 120 may predict a second maintenance target object to be maintained after the maintenance of the first maintenance target object currently being maintained is completed based on predetermined correlation data between the recognized at least one component object and the respective maintenance objects. Herein, the first maintenance target may refer to an initial maintenance target object and the second maintenance target object may refer to a maintenance target object to be maintained following the first maintenance target object.

The correlation data may include multiple rule information pieces corresponding to the respective maintenance objects and reliability information about each of the multiple rule information pieces.

Herein, each of the multiple rule information pieces may include, for example, a maintenance object set to be maintained together during one-time maintenance, and the order of maintaining maintenance objects included in each maintenance object set.

For example, rule information of a first maintenance object and a second maintenance object may be included as the maintenance object set. Herein, reliability information about the rule information of the first maintenance object and the second maintenance object may be derived based on the number of maintenance details about the maintenance of the first maintenance object and the number of maintenance details about the maintenance of the first maintenance object together with the second maintenance object from among all maintenance details.

The maintenance supporting server 120 may transmit a maintenance progress notification about the extracted maintenance target object to the wearable device 110. Herein, the maintenance progress notification may include a notification about a maintenance target object to be currently maintained and a notification about a maintenance target object to be subsequently maintained. Herein, the notification may include, for example, a maintenance availability notification or a maintenance non-availability notification about a maintenance target object to be currently maintained, a maintenance notification about a maintenance target object to be subsequently maintained, a notification about a component object relevant to a maintenance target object, etc.

The maintenance supporting server 120 may transmit maintenance information of the maintenance target object in the form of AR, VR, or MR to the wearable device 110. Herein, the maintenance information may include maintenance details of the first or second maintenance target object, maintenance guide information for the first or second maintenance target object, etc.

Figure 2:
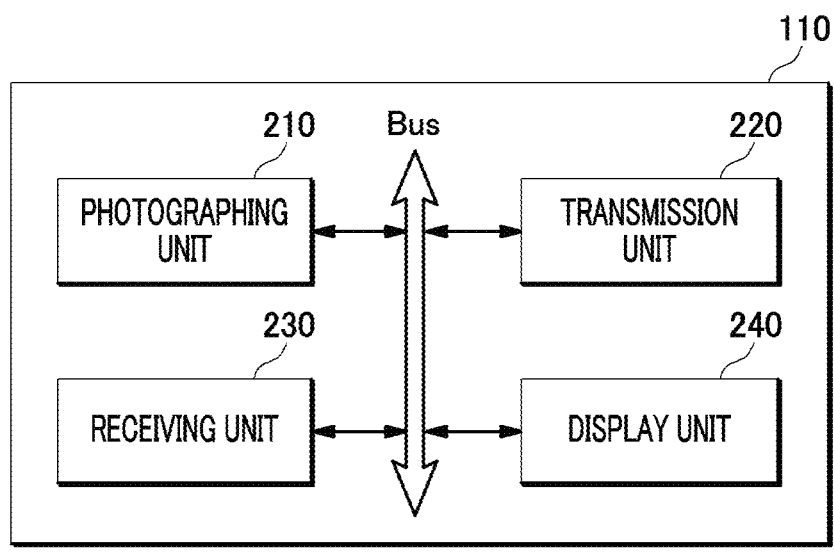
FIG. 2 is a configuration view of a wearable device in accordance with various embodiments described herein.

FIG. 2 is a configuration view of a wearable device in accordance with various embodiments described herein. Referring to FIG. 1 and FIG. 2, the wearable device 110 may include a photographing unit 210, a transmission unit 220, a receiving unit 230, and a display unit 240.

The photographing unit 210 may photograph the military apparatus 100 with the camera provided in the wearable device 110.

The transmission unit 220 may transmit a photographed image of the military apparatus 100 to the maintenance supporting server 120. For example, the transmission unit 220 may transmit a hololens image of the military apparatus 100 to the maintenance supporting server 120.

The receiving unit 230 may receive a maintenance progress notification about a maintenance target object of the military apparatus 100 from the maintenance supporting server 120. The maintenance progress notification may include, for example, a notification about a maintenance target object to be currently maintained and a notification about a maintenance target object to be subsequently maintained. The maintenance progress notification may include, for example, a maintenance availability notification or a maintenance non-availability notification about a maintenance target object to be currently maintained and a maintenance notification about a maintenance target object to be subsequently maintained.

The receiving unit 230 may receive maintenance information of the first or second maintenance target object of the military apparatus 100 from the maintenance supporting server 120. For example, the receiving unit 230 may receive the maintenance information in the form of AR, VR, or MR from the maintenance supporting server 120. The maintenance information may include, for example, maintenance details of the first or second maintenance target object and maintenance guide information for the first or second maintenance target object.

The display unit 240 may display the received maintenance progress notification about the maintenance target object on the display. For example, the display unit 240 may display the maintenance progress notification in the form of any one of AR, VR, or MR through the display of the wearable device 110.

The display unit 240 may display the received maintenance information of the first or second maintenance target object on the display.

Figure 3:
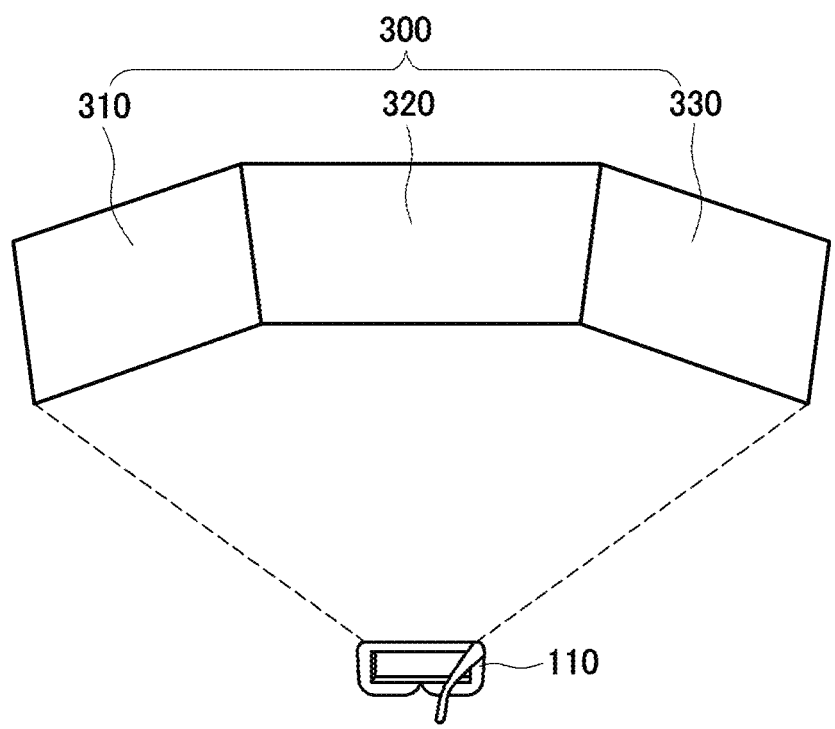
FIG. 3 is an example diagram provided to explain a process of displaying maintenance information of a maintenance target object on a display in a wearable device in accordance with various embodiments described herein.

FIG. 3 is an example diagram provided to explain a process of displaying maintenance information of a maintenance target object on a display in a wearable device in accordance with various embodiments described herein. Referring to FIG. 3, the wearable device 110 may display maintenance information of a maintenance target object on a display 300.

For example, the wearable device 110 may display maintenance guide information for the maintenance target object in the form of VR in a first area 310 of the display 300. The wearable device 110 may display a maintenance guide video or a maintenance manual with voice/image/text support for the first or second maintenance target object in the form of VR for the maintenance mechanic in the first area 310 of the display 300.

For another example, the wearable device 110 may display maintenance details of the first or second maintenance target object in the form of AR in a second area 320 of the display 300. The wearable device 110 may display a nearest-neighbor distance using case-based inference for maintenance cases through the second area 320 of the display 300 and thus facilitate a marker-less approach to the first or second maintenance target object and a component in the maintenance details and support maintenance.

For another example, the wearable device 110 may display component object information of a maintenance tool box in a third area 330 of the display 300. The wearable device 110 may display, in the third area 330 of the display 300, required components and a list of maintenance tools which are selected by the maintenance mechanic and may provide an interaction matrix relevant to the maintenance support.

Figure 4:
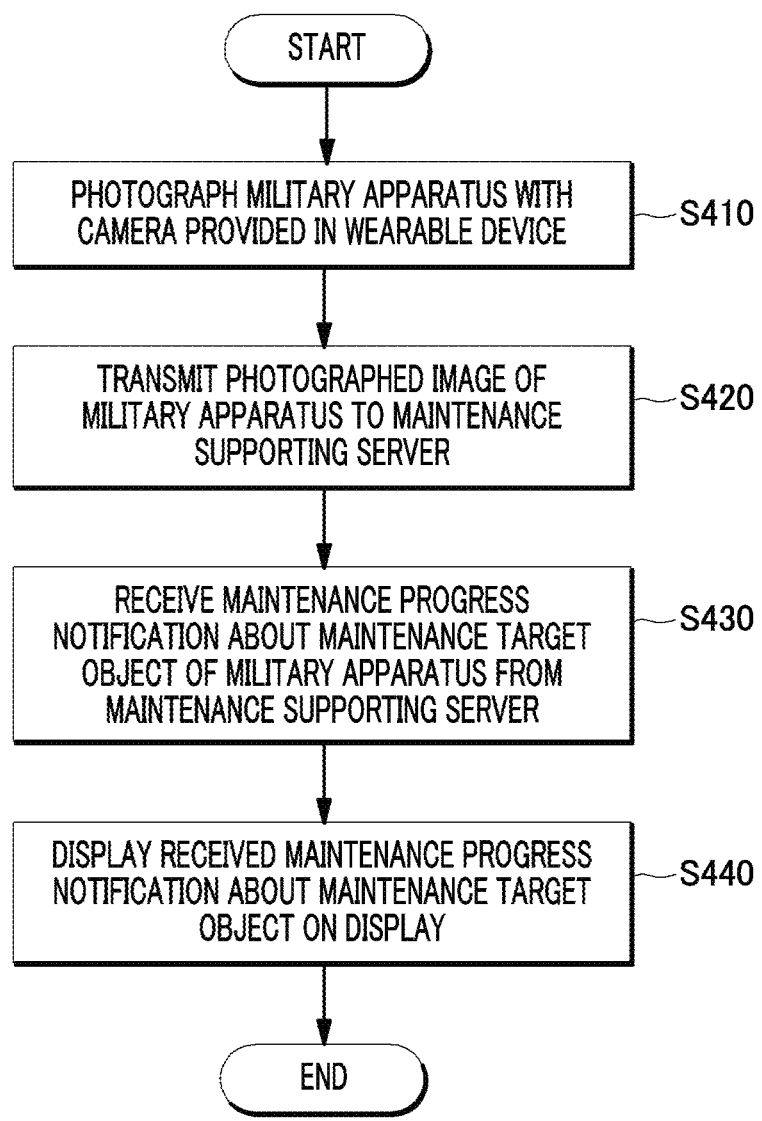
FIG. 4 is a flowchart showing a method for receiving the maintenance support for a military apparatus by a wearable device in accordance with various embodiments described herein.

FIG. 4 is a flowchart showing a method for receiving the maintenance support for a military apparatus by a wearable device in accordance with various embodiments described herein. A method for receiving the maintenance support for the military apparatus 100 by the wearable device 110 illustrated in FIG. 4 includes the processes time-sequentially performed by the system 1 for supporting the maintenance of a military apparatus according to the embodiment illustrated in FIG. 1 to FIG. 3. Therefore, descriptions of the processes performed by the system 1 for supporting the maintenance of a military apparatus may be applied to the method for receiving the maintenance support for the military apparatus 100 by the wearable device 110 according to the embodiment illustrated in FIG. 1 to FIG. 3, even though they are omitted hereinafter.

In a process S410, the wearable device 110 may photograph the military apparatus 100 with the camera provided in the wearable device 110.

In a process S420, the wearable device 110 may transmit a photographed image of the military apparatus 100 to the maintenance supporting server 120.

In a process S430, the wearable device 110 may receive a maintenance progress notification about the maintenance target object of the military apparatus 100 from the maintenance supporting server 120.

In a process S440, the wearable device 110 may display the received maintenance progress notification about the maintenance target object on the display.

Although not illustrated in FIG. 4, the wearable device 110 may further perform receiving maintenance information of the maintenance target object of the military apparatus 100 from the maintenance supporting server 120 and displaying the received maintenance information of the maintenance target object on the display.

In the descriptions above, the processes S410 to S440 may be divided into additional processes or combined into fewer processes depending on an embodiment. In addition, some of the processes may be omitted and the sequence of the processes may be changed if necessary.

Figure 5:
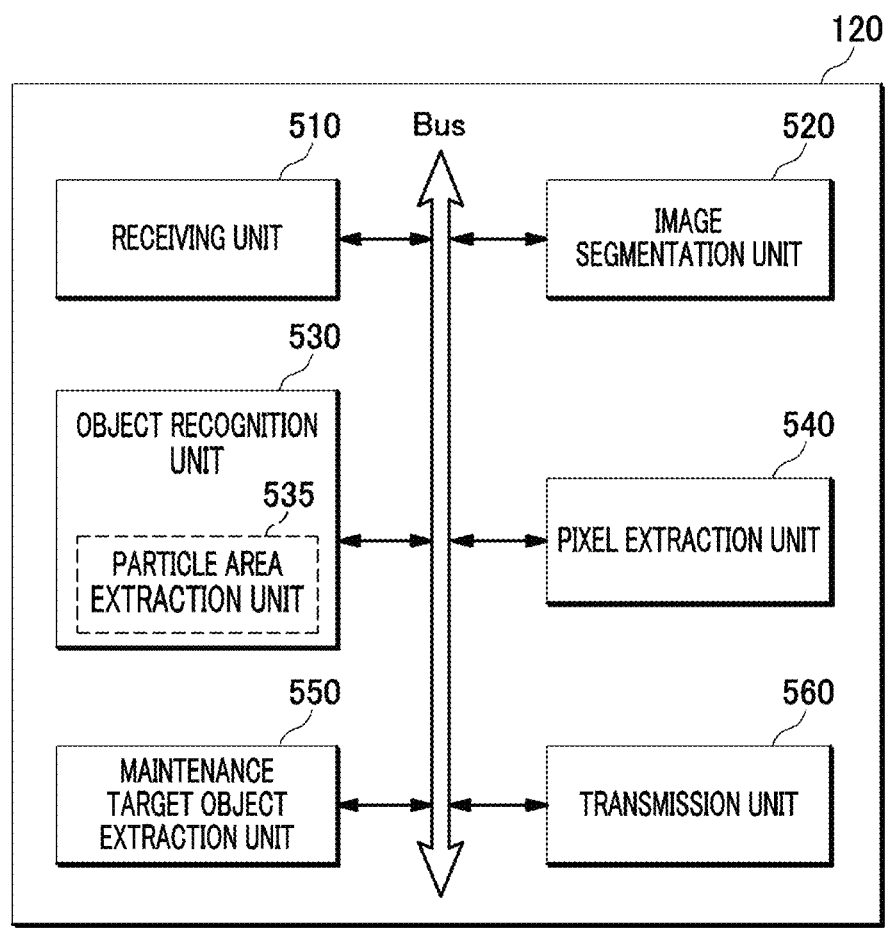
FIG. 5 is a configuration view of a server in accordance with various embodiments described herein.

FIG. 5 is a configuration view of a maintenance supporting server in accordance with various embodiments described herein. Referring to FIG. 5, the maintenance supporting server 120 may include a receiving unit 510, an image segmentation unit 520, an object recognition unit 530, a pixel extraction unit 540, a maintenance target object extraction unit 550, and a transmission unit 560.

The receiving unit 510 may receive an image of the military apparatus 100 from the wearable device 110 worn on the body of the maintenance mechanic. For example, the receiving unit 510 may receive a hololens image of the military apparatus 100 from the wearable device 110 worn on the body of the maintenance mechanic.

The receiving unit 510 may further receive at least one of gaze information of the maintenance mechanic and head motion information of the maintenance mechanic from the wearable device 110.

The image segmentation unit 520 may segment a frame of the image into multiple cells. The frame of the image is segmented into the multiple cells to detect an object and edges (lines, curves, etc.) and thus to simplify or convert the expression of the image into a more meaningful and easy-to-interpret one. In order for the wearable device 110 to recognize an object, objects such as an object and a target object in a digital image (2D), a video, and a real image need to be classified according to general categories and grouped into multiple groups in a frame. The result of segmenting a frame of the image into multiple cells may be a group of sections collectively including the whole image or a group of outlines extracted from the image. Pixels in a section are similar to each other in terms of certain features such as color, brightness, and material or calculated attributes, and neighboring sections may be significantly different from each other in the same features.

The object recognition unit 530 may detect multiple maintenance objects from the image and recognize at least one component object corresponding to at least one of the detected multiple maintenance objects. The object recognition unit 530 may recognize at least one component object included in a maintenance target object and extract a location of the recognized component object. For example, the object recognition unit 530 may detect an edge of the at least one component object by applying the extracted location of the at least one component object to a cell of a frame of the image.

The pixel extraction unit 540 may extract pixels from the recognized at least one component object. In this case, the pixel extraction unit 540 may cluster the extracted at least one pixel into similar pixel groups. For example, the pixel extraction unit 540 may use the k-means method to extract pixels from the recognized component object and cluster the pixels into similar pixel groups. The reason for clustering is that a feature and a state for each location of the recognized component object are needed and there may be a difference in the number of feature and state and accuracy in prediction depending on the size of a location unit. Therefore, the number of clusters may be determined by anticipating that pixels are previously clustered in a parallel manner regardless of the hierarchy of clusters, and, thus, partial clustering can be achieved.

Figure 6B:
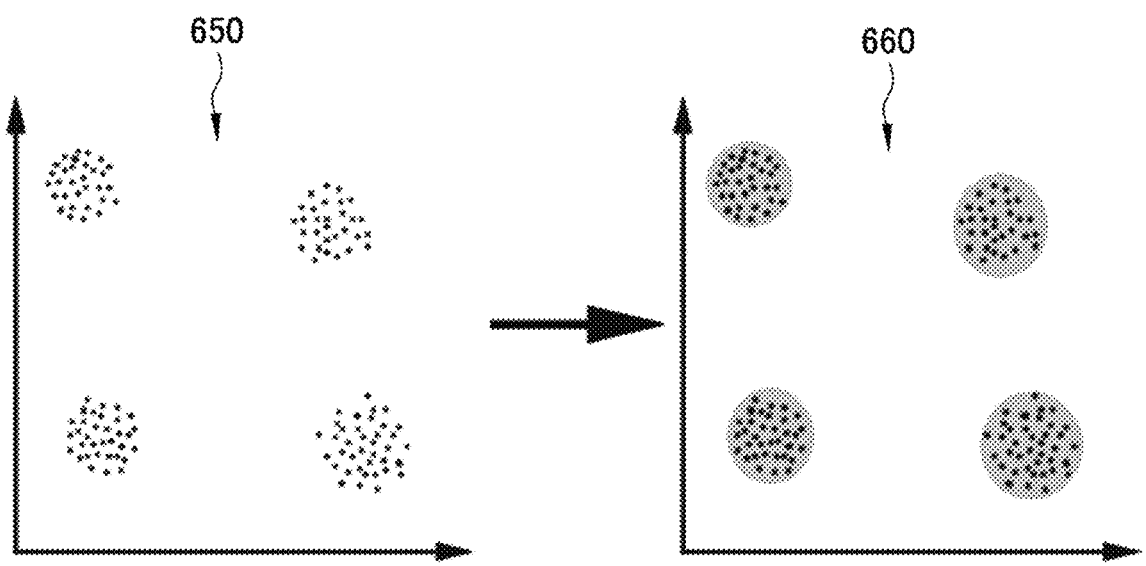

FIG. 6A and FIG. 6B are example diagrams provided to explain a process of recognizing a component object of a military apparatus and extracting pixels of the component object in accordance with various embodiments described herein.

FIG. 6A is an example diagram provided to explain a process of recognizing a component object in accordance with various embodiments described herein. Referring to FIG. 6A, the maintenance supporting server 120 may recognize a component object included in a maintenance target object, extract a location of the recognized component object, and apply the extracted location of the component object to a cell of a 2D image frame 600 segmented into multiple cells to detect an edge of the component object. The 2D image frame 600 may be configured to be equally segmented into the smallest unit cells, and the edge of the component object can be detected by applying the location of the component object to a reference cell 610 of the image frame. Further, a direct cell 620 and an indirect cell 630 may be derived from the reference cell 610 to determine an approach state of the component object to a maintenance object. An approach state of the frame may be set to include the size and direction of the maintenance object by applying the k-means method.

For example, the server 120 may determine approach states of component objects 640 such as $T_1, T_2, T_3, \ldots, T_n$ to a maintenance target object by using a function of a component object included in a maintenance object in each object or a function of neighboring objects. The maintenance supporting server 120 may detect an approach area of the image frame and record a change in approach state.

FIG. 6B is an example diagram provided to explain a process of extracting pixels of a component object and clustering the pixels into similar pixel groups in accordance with various embodiments described herein. Referring to FIG. 6B, the maintenance supporting server 120 may extract pixels 650 of the recognized component object and cluster the extracted pixels 650 into similar pixel groups 660. In this case, the server 120 may use the k-means method to cluster the pixels 650 into the similar pixel groups 660.

The k-means method can segment n (component object) number of objects into k (maintenance target object) number of clusters when predicting a subsequent action for sequential events in a hololens image. The similarity of clusters can be derived by measuring a mean value of objects as the centers of gravity in the respective clusters and makes it become suitable for application to hololens environment or a head-mounted display (HMD) device.

According to the K-means method, a conditional probability of a following effect is as follows. In a first process, the number k of clusters is determined and an initial value or a cluster centroid is allocated to each cluster. In a second process, all the data are assigned to the nearest cluster centroid by using a Euclidean distance. In a third process, a new cluster centroid is calculated to minimize a distance between data assigned to each cluster and the new cluster centroid. In a fourth process, the second process and the third process are repeated until there is little change in cluster centroid.

Referring to FIG. 5 again, the object recognition unit 530 may recognize multiple maintenance objects and at least one component object from the image based on a filter that uses an Euclidean distance between pixels in the image. Herein, the filter that uses an Euclidean distance between pixels may be an adaptive Kalman filter. The object recognition unit 530 may further include a particle area extraction unit 535.

The particle area extraction unit 535 may extract particle areas corresponding to the respective maintenance objects by applying a color- and texture-based particle filter to the image.

For example, the particle area extraction unit 535 may extract a particle area including a maintenance object from the image by generating particles, calculating the sum of squared difference (SSD) in brightness and the SSD in gradient between a 3D environment model image projected by each particle (pose) and a hololens image, and updating a probability model for each particle.

Herein, particle areas corresponding to multiple maintenance objects can be created and tracked in real time by applying the color- and texture-based particle filter. Thus, if a maintenance object to create is selected from an initial image, the selected maintenance object may be determined as a target particle and the target particle may be modeled into an initial state for tracking.

The object recognition unit 530 may track at least one component object being moved by the maintenance mechanic from the image by applying the adaptive Kalman filter to the particle areas.

Figure 7A:
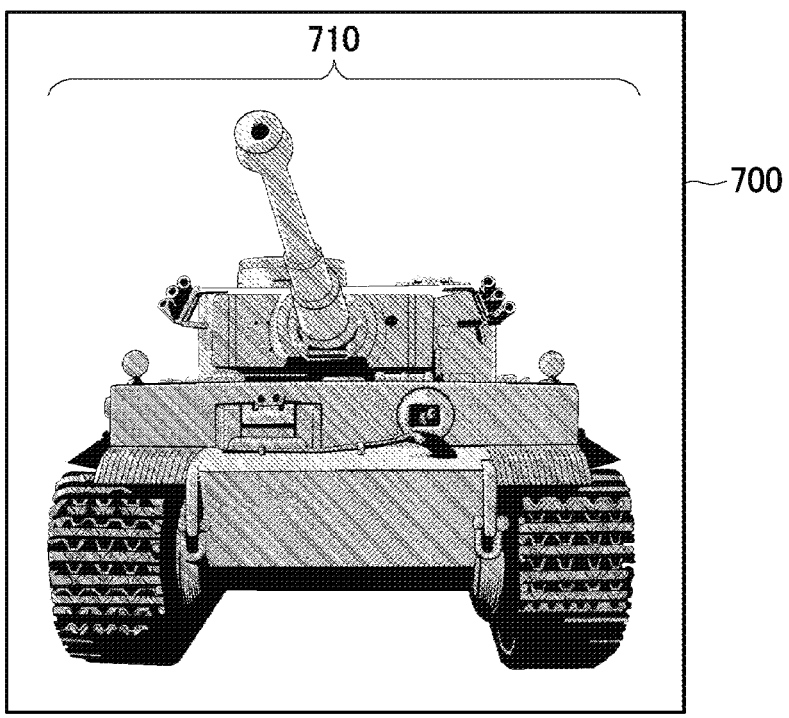
FIG. 7A to FIG. 7C are example diagrams provided to explain a process of recognizing a maintenance object and a component object from an image based on a filter that uses an Euclidean distance between pixels in the image in accordance with various embodiments described herein.
Figure 7B:
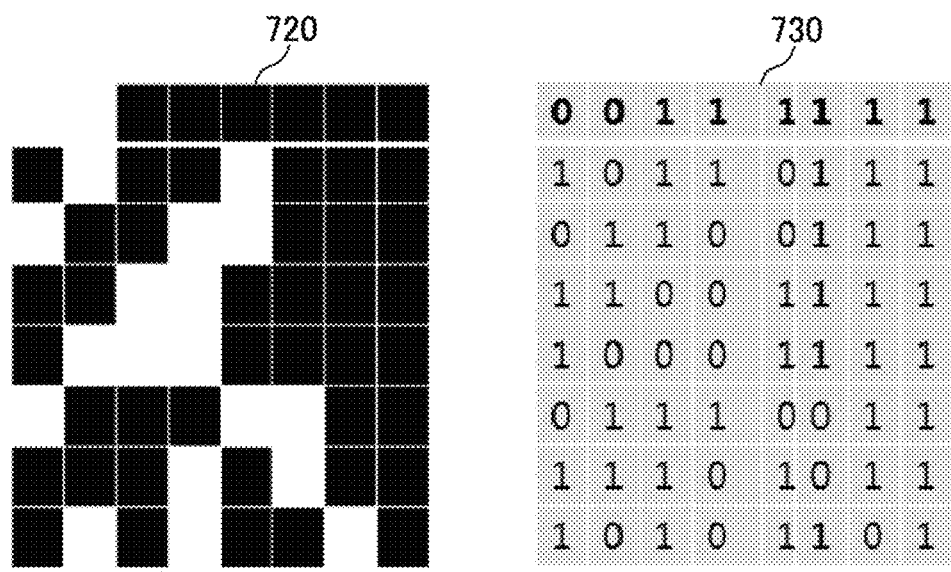
Figure 7C:
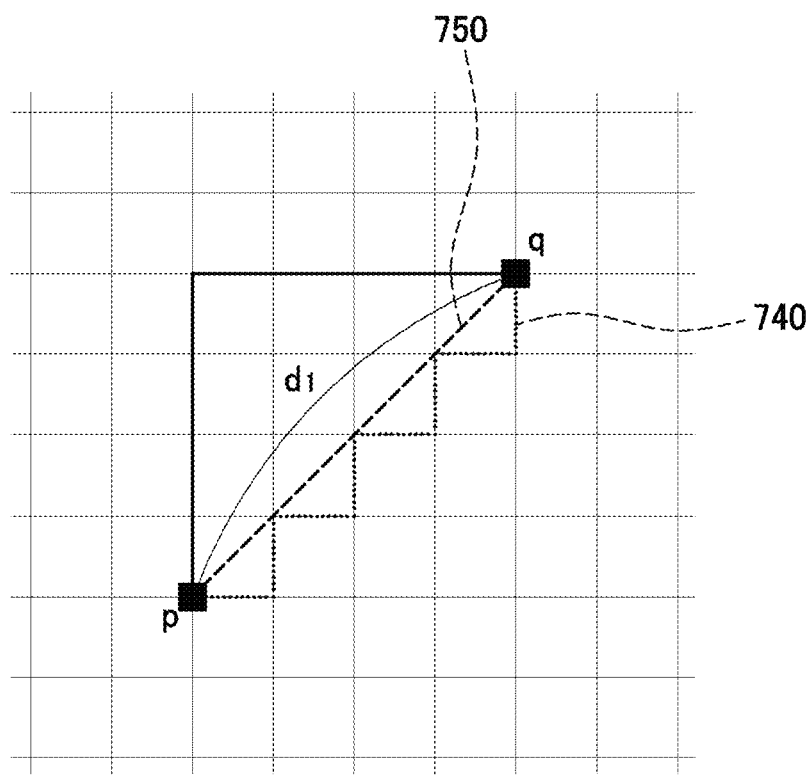

FIG. 7A to FIG. 7C are example diagrams provided to explain a process of recognizing a maintenance object and a component object from an image based on a filter that uses an Euclidean distance between pixels in the image in accordance with various embodiments described herein.

Referring to FIG. 7A, a photographed image 700 of a military apparatus may include multiple maintenance objects 710.

Referring to FIG. 7B, the object recognition unit 530 may perform black-and-white conversion 720 to a particle area and then perform binarization 530 (0 or 1) to each pixel included in the black-and-white converted particle area. The object recognition unit 530 may recognize an object by connecting binarized pixels with a value of "1". In this case, the object recognition unit 530 may use an Euclidean distance to recognize an object.

FIG. 7C is an example diagram comparing an Euclidean distance with a Manhattan distance. Referring to FIG. 7C, it can be seen that when pixels p and q are connected using a Manhattan distance 740, an interpixel distance between the pixels p and q is 8.

Meanwhile, it can be seen that when pixels p and q are connected using an Euclidean distance 750, an interpixel distance between the pixels p and q is _, which is much shorter than the distance when using the Manhattan distance 740.

As such, the object recognition unit 530 can more accurately and effectively recognize a maintenance object and a component object by using an evolved Kalman filter, i.e., an Euclidean distance between pixels.

Referring to FIG. 5 again, the object recognition unit 530 may recognize at least one component object included in a maintenance target object and extract a location of the recognized component object.

The object recognition unit 530 may correct the focus of the maintenance mechanic's gaze based on sensing data obtained by using a global positioning system (GPS) and an inertial measurement unit (IMU) provided in the wearable device 110. Herein, the sensing data may include a direction of progress, transversal and longitudinal acceleration, and roll, pitch and yaw angular speed.

Even if motion blur or occlusion occurs, it is possible to track the focus of the maintenance mechanic by correcting the focus of the maintenance mechanic's gaze based on the sensing data.

The maintenance target object extraction unit 550 may extract a first maintenance target object from multiple maintenance target objects based on distances between at least one component object recognized by the object recognition unit 530 and respective maintenance objects. For example, the maintenance target object extraction unit 550 may extract a maintenance object which the at least one component object is approaching as the first maintenance target object.

The maintenance target object extraction unit 550 may determine, from the image, an approach state of each of at least one component object being moved by the maintenance mechanic to a maintenance object. Herein, the approach state refers to a distance between maintenance objects of the military apparatus 100 and a variation depending on distance and time. The maintenance target object extraction unit 550 may derive a relative approach state of each component object to a maintenance object.

For example, the maintenance target object extraction unit 550 may determine an approach state of each component object to a maintenance object as any one of Neutral, Inward, and Outward. Neutral refers to a state in which a maintenance object is not detected from an image, Inward refers to a state in which a component object detected from an image approaches a maintenance object, and Outward refers to a state in which a component object in an image moves away from a maintenance component. It is possible to reduce resources required for operation and storage of approach states by using these three state values.

For example, [Neutral, Inward] or [Outward, Inward] indicating a preceding indirect element mobile characteristic and a current indirect element mobile characteristic may represent a relative approach state in which a component object in a coverage area from the military apparatus 100 moves away from a maintenance component and gets closer to the maintenance object over time.

Herein, the distance unit for determining an approach state may vary depending on an object recognition method and a measurement device. For example, a measurable range for recognizing an object in a hololens image may employ a distance based on a specific length unit such as m or cm and a distance between component objects in a maintenance object can be used as a reference. In this case, the maintenance target object extraction unit 550 may derive a relative approach state between a maintenance object and a component object for all of maintenance items.

The reason for determining an approach state is that maintenance objects and component objects may be fixed or movable due to the characteristics of the of the military apparatus 100 and the determination of an approach state can be applied when a relative approach state of maintenance object and a component object changes as the wearable device 110 moves.

The maintenance target object extraction unit 550 may predict a second maintenance target object to be maintained after the maintenance of a first maintenance target object currently being maintained is completed based on predetermined correlation data between the recognized at least one component object and the respective maintenance objects. Herein, the first maintenance target object may refer to an initial maintenance target object and the second maintenance target object may refer to a maintenance target object to be maintained following the first maintenance target object.

The correlation data may include multiple rule information pieces and reliability information about each of the multiple rule information pieces. Herein, each of the multiple rule information pieces may include, for example, a maintenance object set to be maintained together during one-time maintenance, and the order of maintaining maintenance objects included in each maintenance object set. For example, the multiple rule information pieces include rule information between a first maintenance object and a second maintenance object, and the reliability information may be derived based on the number of maintenance details about the maintenance of the first maintenance object and the number of maintenance details about the maintenance of the first maintenance object together with the second maintenance object.

The transmission unit 560 may transmit maintenance information of the first or second maintenance object in the form of AR, VR, or MR to the wearable device 110. Herein, the maintenance information may include, for example, maintenance details of the first or second maintenance target object and maintenance guide information for the first or second maintenance target object.

The transmission unit 560 may transmit a maintenance progress notification of the extracted maintenance target object to the wearable device 110. Herein, the notification may include, for example, a maintenance availability notification or a maintenance non-availability notification about a maintenance target object to be currently maintained, a maintenance notification about a maintenance target object to be subsequently maintained, a notification about a component object relevant to a maintenance target object, etc. For example, the transmission unit 560 may transmit a notification to display and highlight a maintenance target object A on the wearable device 110 in order for the maintenance mechanic to perform the maintenance of the maintenance target object A.

Further, if the maintenance mechanic is currently performing the maintenance of the maintenance target object A, the transmission unit 560 may transmit a notification to display and highlight a maintenance target object B on the wearable device 110 in order for the maintenance mechanic to perform the maintenance of the maintenance target object B. In this case, the maintenance target object B may be a maintenance object derived by the maintenance target object extraction unit 550 from a maintenance rule with the highest reliability in the correlation data.

Figure 8A:
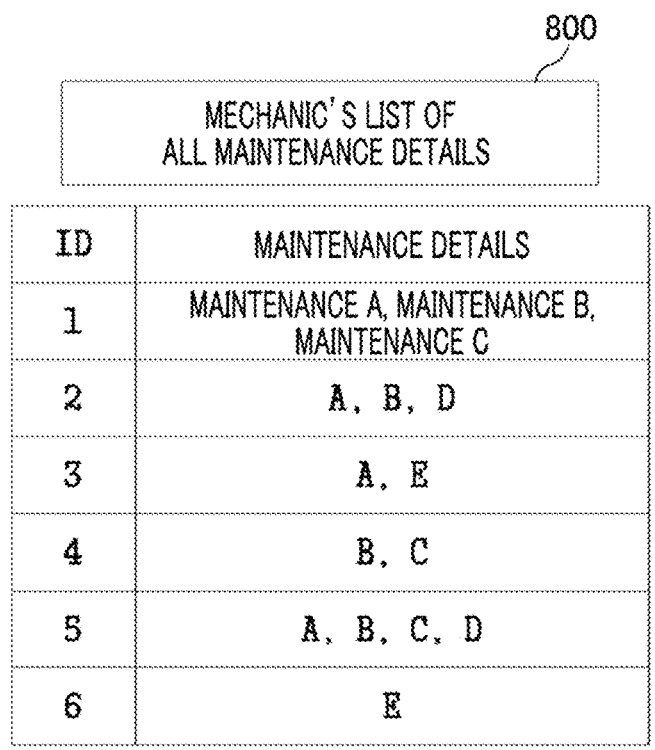
FIG. 8A and FIG. 8B are example diagrams provided to explain correlation data in accordance with various embodiments described herein.
Figure 8B:
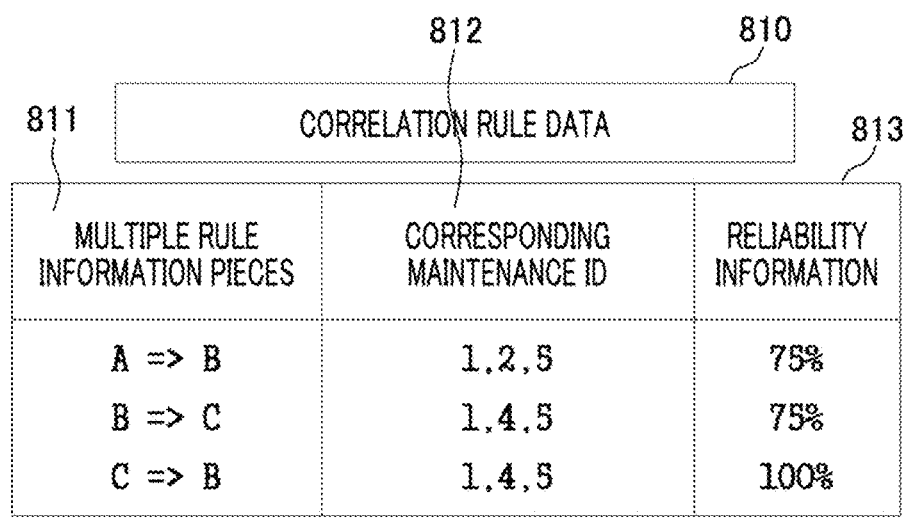

FIG. 8A and FIG. 8B are example diagrams provided to explain correlation data in accordance with various embodiments described herein.

The maintenance supporting server 120 may use a Markov matrix to create correlation data. For example, if all state spaces in a maintenance space to maintain the military apparatus 100 belong to a finite set, a time-homogeneous Markov chain can be represented as a finite graph with real numbers between 0 and 1 on each side. That is, a progress matrix is used in a discrete time Markov chain defined on a state space S, and the Markov matrix is a generalization of the properties of this matrix. The limiting distribution of the Markov chain can be derived by deriving characteristic values and characteristic vectors of this matrix.

To apply this method, the server 120 may assign state transition diagrams to respective objects by using the formula of "(previous location Xn−1, current location Xn) and (location to be applied Xn+1)". To this end, a transition probability between mobility states can be mathematically calculated using a conditional probability. The transition probability refers to a conditional probability at which the transition between states may occur.

The maintenance supporting server 120 may find a tendency included in a component object by using the above formula and use the tendency to find the rules of correlation. For example, the maintenance supporting server 120 may match a previous location, a current location, and a next location of the component object.

The maintenance supporting server 120 may derive the correlation between at least one maintenance object and at least one component object based on the created correlation data.

Referring to FIG. 8A, a list 800 of all maintenance details may include a set of maintenance component objects to be maintained together during one-time maintenance.

For example, it can be seen that during maintenance corresponding to a first ID, the maintenance is performed to a maintenance object A, a maintenance object B, and a maintenance object C and during maintenance corresponding to a second ID, the maintenance is performed to the maintenance object A, the maintenance object B, and a maintenance object D.

Referring to FIG. 8B, correlation data 800 may include multiple rule information pieces 811 and maintenance IDs 812 and reliability information pieces 813 corresponding to the respective rule information pieces 811.

The multiple rule information pieces 811 may be selected as rule information for the maintenance of the first maintenance object together with the second maintenance object. The multiple rule information pieces are selected based on support level information indicating the ratio of the number of maintenances of the first maintenance object together with the second maintenance object to the total number of maintenances. In this case, the multiple rule information pieces may be selected when support level information for the maintenance of the first maintenance object together with the second maintenance object is a predetermined ratio or more (e.g., 50% or more).

For example, support level information for the maintenance of the maintenance object A together with the maintenance object B is derived as 3/6=50% from the ratio of the number of (3) maintenances of the maintenance object A together with the maintenance object B to the total number of (6) maintenances. Thus, the maintenance of the maintenance object A together with the maintenance object B can be used as a single rule information piece.

For another example, support level information for the maintenance of the maintenance object B together with the maintenance object B is derived as 2/6=33% from the ratio of the number of (2) maintenances of the maintenance object B together with the maintenance object D to the total number of (6) maintenances. Therefore, the support level information for the maintenance object B and the maintenance object D cannot reach the predetermined ratio and thus cannot be used as a single rule information piece. The correlation data can be more stabilized by using the support level information.

The reliability information pieces 813 may be derived based on the number of maintenances of the first maintenance object and the number of maintenances of the first maintenance object together with the second maintenance object from the all maintenance details 800.

For example, if the first maintenance object is a maintenance object A and the second maintenance object is a maintenance object B, the maintenance object A is included in a first maintenance ID, a second maintenance ID, a third maintenance ID, and a fifth maintenance ID from among the all maintenance details 800 and the maintenance object B is included in the first maintenance ID, the second maintenance ID, a fourth maintenance ID, and the fifth maintenance ID from among the all maintenance details 800.

Further, it can be seen that the maintenance IDs for the maintenance of the maintenance object A together with the maintenance object B includes the first maintenance ID, the second maintenance ID, and the fifth maintenance ID.

In this case, since the reliability information 713 is derived based on the number of maintenances of the maintenance object A together with the maintenance object B with respect to the number of maintenances of the maintenance object A, rule information for the maintenance of the maintenance object A together with the maintenance object B is derived as (the first maintenance ID, the second maintenance ID, the fifth maintenance ID)/(the first maintenance ID, the second maintenance ID, the third maintenance ID, the fifth maintenance ID)=3/4=75%.

For example, the reliability information 813 may correspond to the first maintenance ID, the second maintenance ID, and the fifth maintenance ID for the maintenance of the maintenance object A together with the maintenance object B among the first maintenance ID, the second maintenance ID, the third maintenance ID, and the fifth maintenance ID for the maintenance of the maintenance object A. This means that three of the four maintenances are performed to the maintenance object A together with the maintenance object B, and, thus, the reliability is 75%. The server 120 may determine a maintenance target object in order from the highest support level among the rules with high reliability.

FIG. 9 is a flowchart showing a method for supporting the maintenance of a military apparatus by a maintenance supporting server in accordance with various embodiments described herein. A method for supporting the maintenance of the military apparatus 100 by the server 120 illustrated in FIG. 9 includes the processes time-sequentially performed by the system 1 for supporting the maintenance of a military apparatus according to the embodiment illustrated in FIG. 1 to FIG. 8. Therefore, descriptions of the processes performed by the system 1 for supporting the maintenance of a military apparatus may be applied to the method for supporting the maintenance of the military apparatus 100 by the server 120 according to the embodiment illustrated in FIG. 1 to FIG. 8, even though they are omitted hereinafter.

In a process S910, the maintenance supporting server 120 may receive an image of the military apparatus 100 from the wearable device 110 worn on the body of the maintenance mechanic.

In a process S920, the maintenance supporting server 120 may recognize multiple maintenance objects and at least one component object from the image based on a filter that uses an Euclidean distance between pixels in the image.

In a process S930, the maintenance supporting server 120 may predict a second maintenance target object to be maintained after the maintenance of a first maintenance target object currently being maintained is completed based on predetermined correlation data between the recognized at least one component object and the respective maintenance objects.

In the descriptions above, the processes S910 to S930 may be divided into additional processes or combined into fewer processes depending on an embodiment. In addition, some of the processes may be omitted and the sequence of the processes may be changed if necessary.

The method for receiving the maintenance support for a military apparatus by a wearable device and the method for providing the maintenance support for a military apparatus by a server illustrated in FIG. 1 to FIG. 9 can be implemented in a computer program stored in a medium to be executed by a computer or a storage medium including instructions codes executable by a computer. Further, the method for receiving the maintenance support for a military apparatus by a wearable device and the method for providing the maintenance support for a military apparatus by a server illustrated in FIG. 1 to FIG. 9 can be implemented in a computer program stored in a medium to be executed by a computer A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A server that supports a maintenance of a military apparatus, comprising:
   a receiving unit that receives an image of a military apparatus from a wearable device worn on the body of a maintenance mechanic;
   an object recognition unit that recognizes multiple maintenance objects and at least one component object from the image based on a filter that uses an Euclidean distance between pixels in the image; and a maintenance target object extraction unit that predicts a second maintenance target object to be maintained after the maintenance of a first maintenance target object currently being maintained is completed based on predetermined correlation data between the recognized at least one component object and the multiple maintenance objects.

2. The server of claim 1,
wherein the maintenance target object extraction unit extracts the first maintenance target object from among the multiple maintenance objects based on distances between the recognized at least one component object and the multiple maintenance objects.

3. The server of claim 2,
wherein the object recognition unit determines, from the image, an approach state of the at least one component object being moved by the maintenance mechanic to each of the multiple maintenance objects.

4. The server of claim 3,
wherein the maintenance target object extraction unit extracts a maintenance object which the at least one component object is approaching as the first maintenance target object, recognizes a first component object included in the extracted first maintenance target object, and extracts a location of the recognized first component object.

5. The server of claim 4, further comprising:
an image segmentation unit that segments a frame of the image into multiple cells,
wherein the object recognition unit detects an edge of the recognized first component object by applying the extracted location of the recognized first component object to a cell of the frame of the image.

6. The server of claim 1,
a pixel extraction unit that extracts pixels from the recognized at least one component object,
wherein the pixel extraction unit clusters the extracted at least one pixel into similar pixel groups.

7. The server of claim 6,
wherein the maintenance target object extraction unit extracts the clustered similar pixel groups as multiple candidate maintenance areas and extracts a maintenance area including the first maintenance target object from among the extracted multiple candidate maintenance areas by using the distances between the at least one component object and the multiple maintenance objects.

8. The server of claim 1,
wherein the object recognition unit further includes a particle area extraction unit that extracts particle areas corresponding to the multiple maintenance objects by applying a color- and texture-based particle filter to the image.

9. The server of claim 8,
wherein the filter that uses an Euclidean distance between pixels is an adaptive Kalman filter, and the object recognition unit tracks the at least one component object being moved by the maintenance mechanic from the image by applying the adaptive Kalman filter to the particle areas.

10. The server of claim 1,
wherein the receiving unit further receives at least one of gaze information of the maintenance mechanic and head motion information of the maintenance mechanic from the wearable device.

11. The server of claim 10,
wherein the object recognition unit corrects the focus of the maintenance mechanic's gaze based on at least one of the gaze information of the maintenance mechanic and the head motion information of the maintenance mechanic.

12. The server of claim 1,
wherein the correlation data include multiple rule information pieces and reliability information about each of the multiple rule information pieces.

13. The server of claim 12,
wherein the multiple rule information pieces include rule information of a first maintenance object and a second maintenance object, and
the reliability information is derived based on the number of maintenance of the first maintenance object and the number of maintenance of the first maintenance object together with the second maintenance object.

14. The server of claim 1, further comprising:
a transmission unit that transmits a maintenance progress notification about the first or second maintenance target object to the wearable device,
wherein the maintenance progress notification includes a notification about the first maintenance target object to be currently maintained and a notification about the second maintenance target object to be subsequently maintained.

15. The server of claim 14,
wherein the transmission unit transmits maintenance information of the first or second maintenance target object in the form of augmented reality, virtual reality, or mixed reality to the wearable device, and
the maintenance information includes maintenance details of the first or second maintenance target object and maintenance guide information for the first or second maintenance target object.

16. A method for supporting a maintenance of a military apparatus by a server, comprising:
receiving an image of a military apparatus from a wearable device worn on the body of a maintenance mechanic;
recognizing multiple maintenance objects and at least one component object from the image based on a filter that uses an Euclidean distance between pixels in the image; and
predicting a second maintenance target object to be maintained after the maintenance of a first maintenance target object currently being maintained is completed based on predetermined correlation data between the recognized at least one component object and the multiple maintenance objects.

* * * * *